(12) United States Patent  (10) Patent No.: US 8,553,947 B2
Benini (45) Date of Patent: Oct. 8, 2013

(54) BIOMETRIC IDENTIFICATION AND VERIFICATION

(75) Inventor: David Benini, Charlestown, MA (US)

(73) Assignee: Aware, Inc., Bedford, MA (US)

( * ) Notice: Subject to any disclaimer, the term of this patent is extended or adjusted under 35 U.S.C. 154(b) by 400 days.

(21) Appl. No.: 12/906,662

(22) Filed: Oct. 18, 2010

(65) Prior Publication Data

US 2011/0311110 A1   Dec. 22, 2011

Related U.S. Application Data

(62) Division of application No. 12/988,056, filed as application No. PCT/US2009/041802 on Apr. 27, 2009.

(60) Provisional application No. 61/125,577, filed on Apr. 25, 2008, provisional application No. 61/134,170, filed on Jul. 7, 2008.

(51) Int. Cl.
*G06K 9/00* (2006.01)

(52) U.S. Cl.
USPC .......................................... 382/115; 235/382

(58) Field of Classification Search
USPC ...................... 382/115–118; 235/380–382
See application file for complete search history.

(56) References Cited

U.S. PATENT DOCUMENTS

| | | | |
|---|---|---|---|
| 6,160,903 A * | 12/2000 | Hamid et al. | 382/115 |
| 6,591,224 B1 * | 7/2003 | Sullivan et al. | 702/179 |
| 7,084,734 B2 * | 8/2006 | Singh | 340/5.2 |
| 7,114,646 B2 * | 10/2006 | Hillhouse | 235/375 |
| 7,263,208 B1 | 8/2007 | Crosby et al. | |
| 7,362,884 B2 * | 4/2008 | Willis et al. | 382/116 |
| 7,492,943 B2 | 2/2009 | Li et al. | |
| 7,545,961 B2 | 6/2009 | Ahern et al. | |
| 7,545,962 B2 * | 6/2009 | Peirce et al. | 382/115 |
| 7,558,765 B2 * | 7/2009 | Kiefer | 706/15 |
| 7,773,784 B2 * | 8/2010 | Boult | 382/124 |
| 7,804,982 B2 * | 9/2010 | Howard et al. | 382/115 |
| 7,864,987 B2 * | 1/2011 | Venkatanna et al. | 382/115 |
| 8,073,287 B1 * | 12/2011 | Wechsler et al. | 382/278 |

(Continued)

FOREIGN PATENT DOCUMENTS

EP   0956818   11/1999

OTHER PUBLICATIONS

Official Action for European Patent Application No. 09733975.8, mailed Jan. 8, 2013.
Official Action for U.S. Appl. No. 12/988,056, mailed Dec. 11, 2012.
U.S. Appl. No. 12/988,056, filed Oct. 15, 2010, Benini.

(Continued)

*Primary Examiner* — Jayesh A Patel
*Assistant Examiner* — Iman K Kholdebarin
(74) *Attorney, Agent, or Firm* — Jason H. Vick; Sheridan Ross, PC

(57) ABSTRACT

In real biometric systems, false match rates and false non-match rates of 0% do not exist. There is always some probability that a purported match is false, and that a genuine match is not identified. The performance of biometric systems is often expressed in part in terms of their false match rate and false non-match rate, with the equal error rate being when the two are equal. There is a tradeoff between the FMR and FNMR in biometric systems which can be adjusted by changing a matching threshold. This matching threshold can be automatically, dynamically and/or user adjusted so that a biometric system of interest can achieve a desired FMR and FNMR.

22 Claims, 13 Drawing Sheets

(56) References Cited

U.S. PATENT DOCUMENTS

| | | | |
|---|---|---|---|
| 8,190,540 B2* | 5/2012 | Kiefer | 706/15 |
| 8,280,120 B2* | 10/2012 | Hoyos et al. | 382/117 |
| 2001/0048025 A1* | 12/2001 | Shinn | 235/382 |
| 2003/0190076 A1* | 10/2003 | DeLean | 382/209 |
| 2006/0104485 A1* | 5/2006 | Miller et al. | 382/115 |
| 2006/0110014 A1* | 5/2006 | Philomin et al. | 382/118 |
| 2006/0204049 A1* | 9/2006 | Schneider et al. | 382/115 |
| 2008/0049983 A1* | 2/2008 | Miller et al. | 382/115 |
| 2008/0101658 A1 | 5/2008 | Ahern et al. | |
| 2008/0298642 A1* | 12/2008 | Meenen | 382/115 |
| 2009/0097713 A1* | 4/2009 | DeLean | 382/115 |
| 2011/0311110 A1* | 12/2011 | Benini | 382/115 |
| 2012/0057763 A1 | 3/2012 | Horng et al. | |
| 2012/0087549 A1 | 4/2012 | Benini | |
| 2012/0163678 A1* | 6/2012 | Du et al. | 382/117 |
| 2012/0300988 A1* | 11/2012 | Ivanov et al. | 382/115 |
| 2012/0321141 A1* | 12/2012 | Hoyos et al. | 382/115 |
| 2012/0328164 A1* | 12/2012 | Hoyos et al. | 382/115 |
| 2013/0083975 A1* | 4/2013 | Partington et al. | 382/115 |

OTHER PUBLICATIONS

International Search Report for International (PCT) Application No. PCT/US2009/041802), mailed Oct. 20, 2009.

Written Opinion for International (PCT) Application No. PCT/US2009/041802), mailed Oct. 20, 2009.

International Preliminary Report on Patentability for International (PCT) Application No. PCT/US2009/041802), mailed Nov. 4, 2010.

Invitation to Pay Additional Fees and, where Applicable, Protest Fee for International (PCT) Application No. PCT/US2009/041802, mailed Jul. 17, 2009.

Communication Pursuant to Rules 161(1) and 162 EPC for European Patent Application No. 09733975.8, mailed Dec. 3, 2010.

European Search Report for European Patent Application No. 12002652, mailed Jun. 26, 2012.

Notice of Allowance for U.S. Appl. No. 12/988,056, mailed Aug. 2, 2013.

Official Action for European Patent Application No. 12002652.1, mailed Jun. 11, 2013.

* cited by examiner

BIOMETRIC IDENTIFICATION AND VERIFICATION

RELATED APPLICATION DATA

This application is a divisional of U.S. application Ser. No. 12/988,056, filed Nov. 4, 2010, which is a national stage application under 35 U.S.C. §371 of PCT Application No. PCT/US2009/041802, having an international filing date of Apr. 27, 2009, which designated the U.S., which PCT application claims the benefit of and priority under 35 U.S.C. §119(e) to U.S. patent application Ser. Nos. 61/125,577, filed Apr. 25, 2008, entitled "BIOMETRIC IDENTIFICATION METHOD AND SYSTEM," and 61/134,170, filed Jul. 7, 2008, entitled "BIOMETRIC VERIFICATION METHOD AND SYSTEM," each of which are incorporated herein by reference in their entirety.

BACKGROUND

Field of the Invention

This invention generally relates to biometrics. More specifically, an exemplary embodiment of the invention relates to biometric identification. Another exemplary embodiment of the invention relates to biometric verification.

SUMMARY

Biometric systems are used for such things as access control, fingerprint databases, facial recognition and retinal identification, and are in general used to assist with the identification of an individual. A biometric identification solution operates by characterizing a biometric sample (probe) such as a fingerprint, and then using mathematical algorithms to identify the most similar samples in a database (gallery). If one or more samples in the gallery are derived from the same person and source as the probe sample, then the matching algorithm will attempt to identify them as such with a high similarity score.

A theoretical perfect biometric algorithm would always identify with 100% confidence that the samples do in fact match (0% false non-match rate). That is, the samples are derived from the same source, albeit at different times. Similarly, if there does not exist a sample in the database derived from the same source, then a theoretical perfect biometric solution would always identify with 100% confidence that a sample matching the probe sample does not exist in the gallery (0% false match rate).

However, in real biometric systems, false match rates and false non-match rates of 0% do not exist. There is always some probability that a purported match is false, and that a genuine match is not identified.

The performance of biometric systems has often been expressed in part in terms of False Match Rate (FMR) and False Non-Match Rate (FNMR), with the Equal Error Rate (EER) being the rate at which the FNMR and the FMR are equal.

FIG. 1 illustrates an example of match results exhibited by a true biometric identification system. Imposter samples are those known to be derived from a different source than that of the probe. Genuine samples are those known to be derived from the same source as that of the probe.

FIG. 2 illustrates that by setting a threshold, the system is able to achieve a desired tradeoff between the FNMR and FMR as shown in the zoomed in circular portion of FIG. 1. FIG. 3 illustrates the effect of increasing and decreasing the threshold. There is a tradeoff between FMR and FNMR and therefore there is a point (and a threshold) at which the FMR and FNMR are equal. This rate is the equal error rate as mentioned above.

Biometric verification solutions operate by characterizing a live biometric sample, such as a fingerprint, and then using mathematical algorithms to quantify the similarity of the live sample to a single existing sample known to be derived from the individual in question. If this similarity between the two samples is sufficiently high, that is, exceeds some previously specified threshold, then it can be said that the identity of the individual has been biometrically verified. Biometric verification might also be called "one-to-one matching" and has a different application from "biometric identification," or "one-to-many matching," which in contrast measures the similarity between the live biometric sample (probe) and a gallery of samples in an attempt to identify which sample is most similar and therefore most likely to be derived from the same individual.

A theoretical perfect biometric verification algorithm would always identify with 100% confidence that the samples do in fact match (0% false non-match rate). That is, the samples are derived from the same source, albeit at different times. Similarly, such an algorithm would never indicate that samples match if they are derived from different sources (0% false match rate).

In real biometric systems, false match rates and false non-match rates of 0% do not exist. There is always some probability that a purported match is false, and that a genuine match is not identified. The performance of biometric systems is often expressed in part in terms of their false match rate and false non-match rate as discussed above, with the equal error rate being when the two are equal. Similar to biometric identification, there is a tradeoff between the FMR and FNMR with biometric verification which can be adjusted by changing a matching threshold. More specifically, and as illustrated in FIG. 12, an example of match results exhibited by a true biometric verification system is shown. Imposter samples are those known to be derived from a different source than that of the probe. Genuine samples are those known to be derived from the same source as that of the probe. FIG. 13 is an enlarged portion of the circled portion of FIG. 12 and illustrates how the setting of a threshold enables the system to yield a desired tradeoff between the FNMR and FMR.

In FIG. 14, the effect of increasing and decreasing the threshold is illustrated. There is a tradeoff between FMR and FNMR. There is also a point (and a threshold) at which the FMR and the FNMR are equal—as with biometric identification discussed above, this rate is the equal error rate.

Exemplary aspects of the invention are thus directed toward biometric identification. Additional aspects of the invention are directed toward generating a database of match scores between pluralities of imposter sampled pairs in a gallery.

Still further aspects of the invention are directed toward determining a false match rate associated with a threshold, wherein the threshold is determined by cumulative histogram data table recording, for each possible match score value, the number of match scores observed greater than that value divided by the total number of samples.

Even further aspects of the invention are directed toward selecting a false match rate and determining a threshold that will result in the desired false match rate, wherein the threshold is determined by a cumulative histogram data table recording, for each possible match score value, the number of match scores observed greater than that value divided by the total number of samples.

Even further aspects of the invention relate to generating a database of match scores between pluralities of genuine sample pairs in a gallery, wherein the genuine sample pairs are derived from two samples, each from the same source.

Even further aspects of the invention are directed toward determining a false non-match rate associated with a threshold, wherein the threshold is determined by a cumulative histogram data table recording, for each possible match score value, the number of match scores observed greater than that value divided by the total number of samples.

Still further aspects of the invention relate to selecting a false non-match rate and determining a threshold that will result in the desired false non-match rate, wherein the threshold is determined by a cumulative histogram data table recording, for each possible match score value, the number of match scores observed greater than that value divided by the total number of samples.

Additional aspects of the invention relate to biometric verification.

Further aspects relate to generating a database of match scores between pluralities of imposter sample pairs in a gallery, wherein imposter sample pairs are derived from two samples, each from a different source.

Even further aspects of the invention relate to determining a false match rate associated with a threshold, wherein the threshold is determined by a cumulative histogram data table recording, for each possible match score value, the number of match scores observed greater than that value divided by the total number of samples.

Even further aspects of the invention relate to a biometric verification system selecting a false match rate then determining a threshold that will result in the desired false match rate, wherein the threshold is determined by a cumulative histogram data table recording, for each possible match score value, the number of match scores observed greater than that value divided by the total number of samples.

These and other features and advantages of this invention are described in, or are apparent from, the following detailed description of the exemplary embodiments.

BRIEF DESCRIPTION OF THE DRAWINGS

The exemplary embodiments of the invention will be described in detail, with reference to the following figures, wherein.

DETAILED DESCRIPTION

Figure 1:
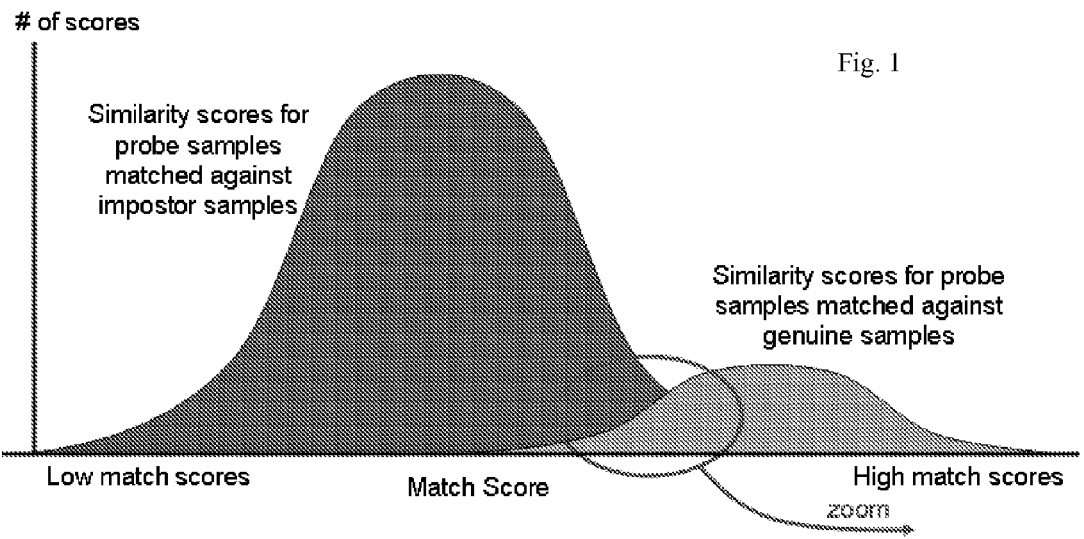
FIG. 1 illustrates an exemplary graph of match results according to this invention.
Figure 2:
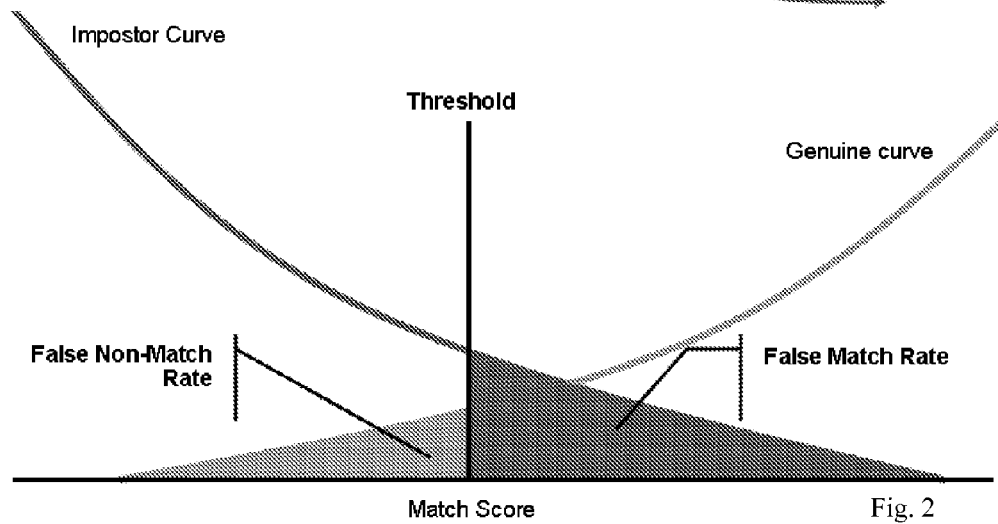
FIG. 2 illustrates the relationship between biometric identification FNMR and FMR according to this invention.
Figure 3:
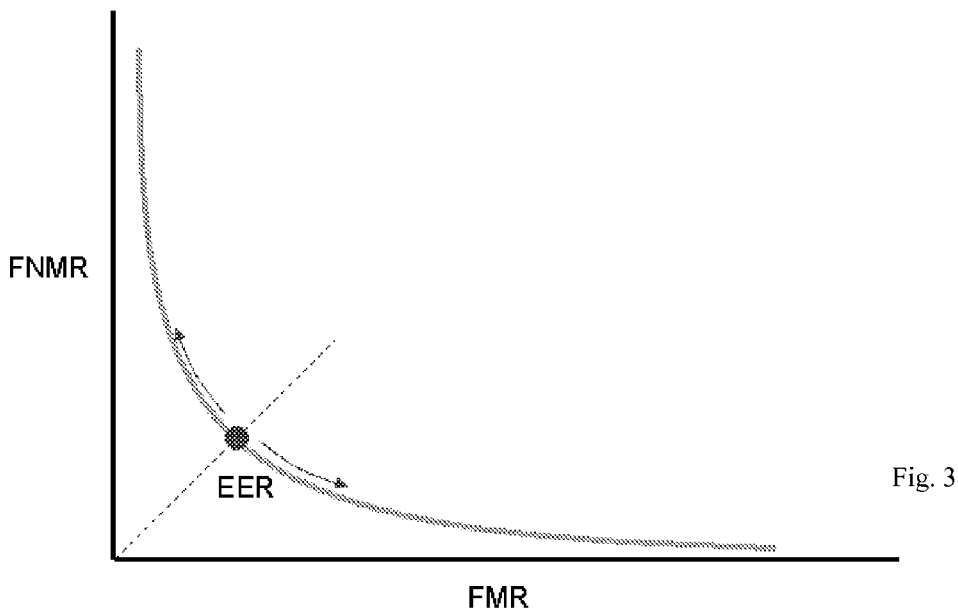
FIG. 3 illustrates the effect of increasing and decreasing the threshold illustrated in FIG. 2 according to this invention.

The exemplary systems and methods of this invention will be described in relation to biometric identification and verification. However, to avoid unnecessarily obscuring the present invention, the following description omits well-known structures and devices that may be shown in block diagram form or are generally known or otherwise summarized. For purposes of explanation, numerous specific details are set forth in order to provide a thorough understanding of the present invention. It should however be appreciated that the present invention may be practiced in a variety of ways beyond the specific detail set forth herein.

Furthermore, while the exemplary embodiments illustrated herein show the various components of the system collocated, it should be appreciated that the various components of the system can be located at distant portions of a distributed network, such as a LAN and/or the internet or within a dedicated system. Thus, it should be appreciated that the components of this system can be combined into one or more devices or collocated on a particular node of a distributed network, such as a communications network. It will be appreciated from the following description, and for reasons of computational efficiency, that the components of the system can be arranged at any location within a distributed network without affecting the operation of the system. Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information.

The term module as used herein can refer to any known or later developed hardware, software, or combination of hardware and software that is capable of performing the functionality associated with that element. Also, while the invention is described in terms of exemplary embodiments, it should be appreciated that individual aspects of the invention can be separately claimed. While the embodiments discussed herein will be directed toward fingerprint biometrics, it should also be appreciated that the systems and methods will work equally well for any type of biometric information, such as digital information representing a physical feature of an animal or human, that includes any type of biometric including, but not limited to, images of fingers, hands, feet or any portion thereof, retinal information, iris information and the like.

The exemplary systems and methods of this invention will be described in relation to biometric identification and verification. However, to avoid unnecessarily obscuring the present invention, the following description omits well-known structures and devices that may be shown in block diagram form, are generally known or otherwise summarized. For purposes of explanation, numerous specific details are set forth in order to provide a thorough understanding of the present invention. It should however be appreciated that the present invention may be practiced in a variety of ways beyond the specific detail set forth herein.

Figure 4:
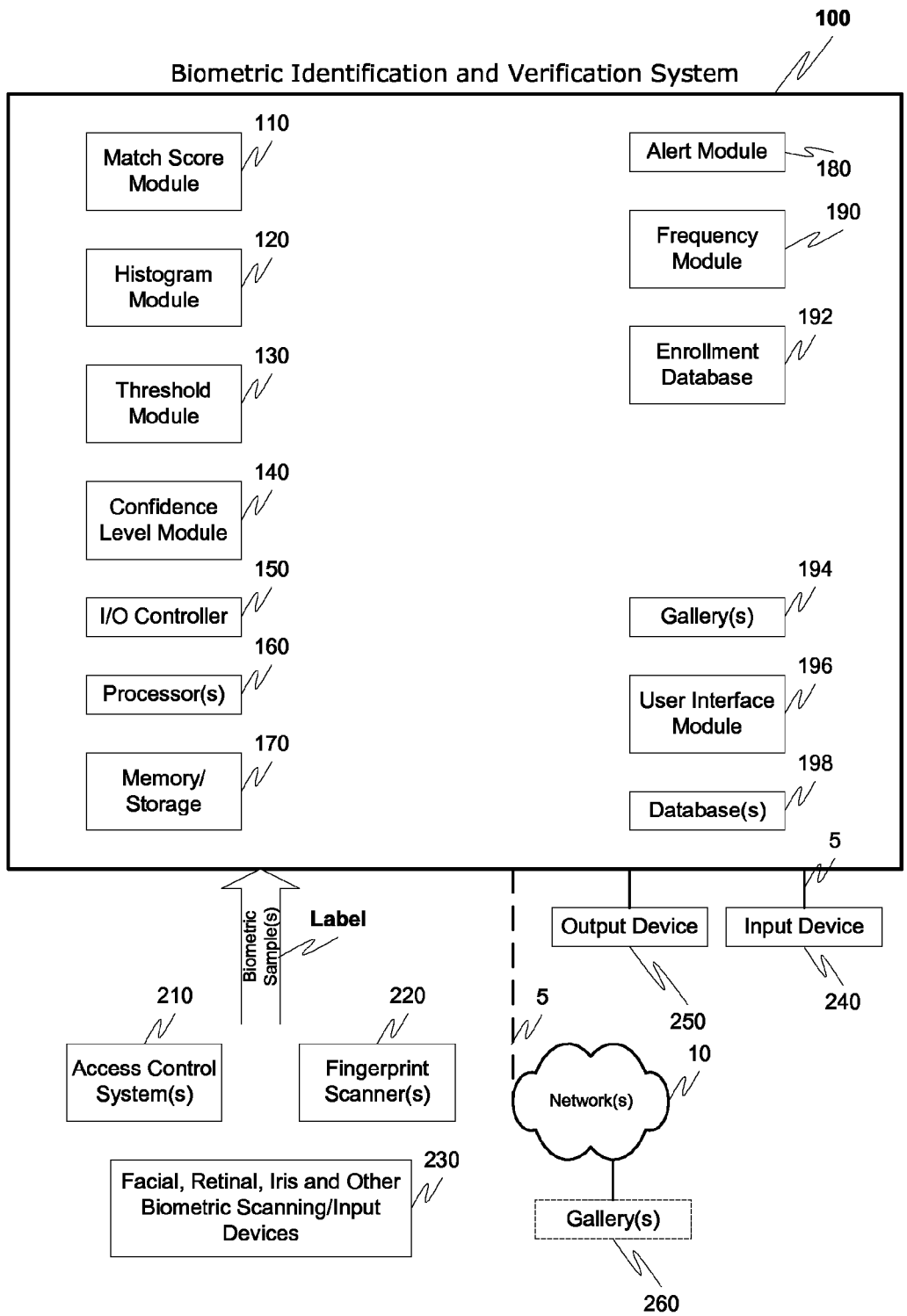
FIG. 4 illustrates an exemplary biometric identification and verification system according to this invention.

FIG. 4 illustrates an exemplary biometric identification and verification system 100. In addition to well known componentry, the system includes a match score module 110, a histogram module 120, a threshold module 130, a confidence level module 140, an I/O controller 150, processor 160, memory/storage 170, alert module 180, frequency module 190, enrollment database 192, gallery 194, user interface module 196 and one or more databases 198.

The biometric identification and verification system 100 receives biometric samples from one or more of an access control system 210, fingerprint scanner 220, facial, retinal, iris and other biometric scanning/input devices 230. The biometric identification and verification system 100 can also optionally be connected, via link 5, to one or more networks 10 that can link, for example, additional galleries 260. In addition, the biometric identification and verification system 100 can be attached to one or more output devices 250, such as a display, and input devices 240, such as a keyboard, mouse or the like.

Typically, a biometric sample is taken from a user and compared to known samples in one or more galleries. Upon the completion of this comparison, the sample from the user is discarded. However, in accordance with an exemplary embodiment of this invention, one or more biometric samples are stored in, for example, gallery 194 or gallery 260 and this historical data used in accordance with the techniques disclosed herein.

Biometric Identification

More specifically, and in accordance with a first exemplary embodiment, imposter match score data is used to automate derivation of a match threshold score that results in the desired biometric identification system false match rate and false non-match rate.

There exists a problem in biometric systems where selecting a match threshold for a given biometric system such that the desired FMR/FNMR levels can be targeted, is a manual, and imprecise process that does not enable the user to consider data from the system in question and automate the threshold setting to optimize undesired error rates. This problem can be addressed using imposter match score data.

More specifically, and in cooperation with the match score module 110 and enrollment database 192, a database of match scores is generated between all unique imposter sample pairs in a gallery, such as gallery 194 or 260. The imposter sample pairs are derived from two samples, each from a different source. Next, the histogram module 120 creates a cumulative histogram data table recording for each possible match score outcome the number of match scores observed greater than that value divided by the total number of samples. This value is the "false match rate" associated with each possible threshold used in the system. A user interface module 196, in cooperation with the output device 250 and input device 240 provides to the user a user interface via which they can select a desired false match rate and apply the threshold that will result in that desired false match rate. This threshold is then applied with the cooperation of the threshold module 130.

As an example, a gallery database has 10,000 samples derived from 10,000 different individuals. The number of unique match scores generated in this manner is equal to n (n−1)/2 where n is the number of samples in the database. The number of unique match scores is therefore 49,995,000.

A user, interfacing with the user interface module 196, can then indicate that they desire the system to perform with a false match rate of, for example, 1 in 10,000. This aligns with the total number of match scores above a threshold of 5,000. In the cumulative histogram data table described above, there is a match score threshold that results in a total of 5,000 scores above it. The threshold module 130 could then apply this threshold to the system. Once applied, and in cooperation with the alert module 180, an alert could optionally be generated and forwarded to a destination, such as output device 250, to alert the user to the resulting FMR with the threshold in use based on actual results using the gallery samples in use. Examples of alerts include text-based alerts such as an email, as well as audible or visual alerts displayed in cooperation with the display.

In accordance with a second exemplary embodiment, the genuine match score data is used to automate derivation of a match threshold score that results in the desired system false match rate and false non-match rate. More specifically, this problem can be addressed using any match score data. More specifically, match score module 110, in cooperation with the enrollment database 192 and one or more galleries, generates a database of match scores between all unique genuine sample pairs in a gallery. The genuine sample pairs are derived from two samples, each from the same source.

Next, the histogram module 120 creates a cumulative histogram data table recording for each possible match score outcome the number of match scores observed greater than that value divided by the total number of samples. This value is the false non-match rate associated with each possible threshold used in the system. A user, in cooperation with the user interface module 196, can then select a desired false non-match rate and apply the threshold with the cooperation of the threshold module 130 that will result in the desired false non-match rate.

For example, a gallery database has 10,000 samples with two derived from each of 5,000 different individuals. The number of unique genuine match scores generated in this manner is 5,000. A user can then specify that they desire the system to perform with a false non-match rate of 1 in 1,000. This aligns with a total number of match scores below the desired threshold of five. In the cumulative histogram data table described, there is a match score threshold that results in a total of five scores below it. The threshold module 130 could then apply this threshold to the system. As discussed above, the alert module 180 can also be programmed to alert the user to the resulting FNMR with the threshold in use based on actual results using the gallery samples in use.

Figure 6:
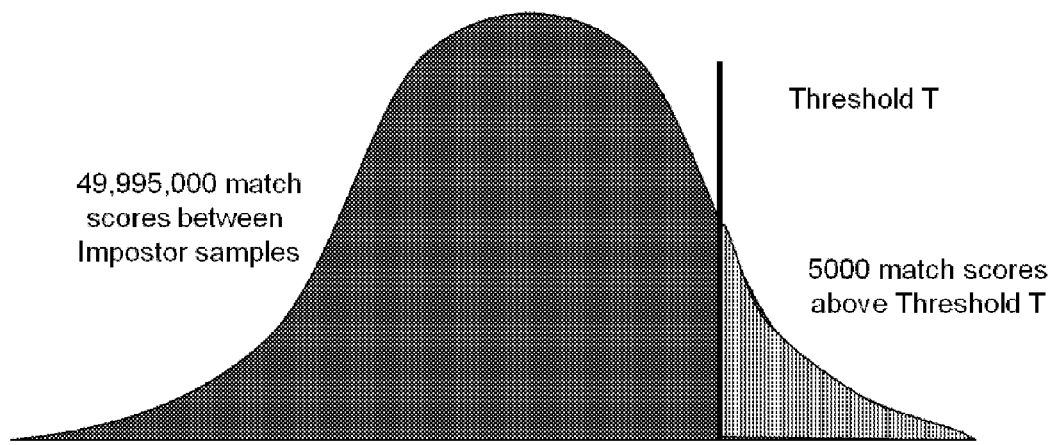
FIG. 6 illustrates an example of the determination of the false match rate for the biometric identification system according to this invention.
Figure 8:
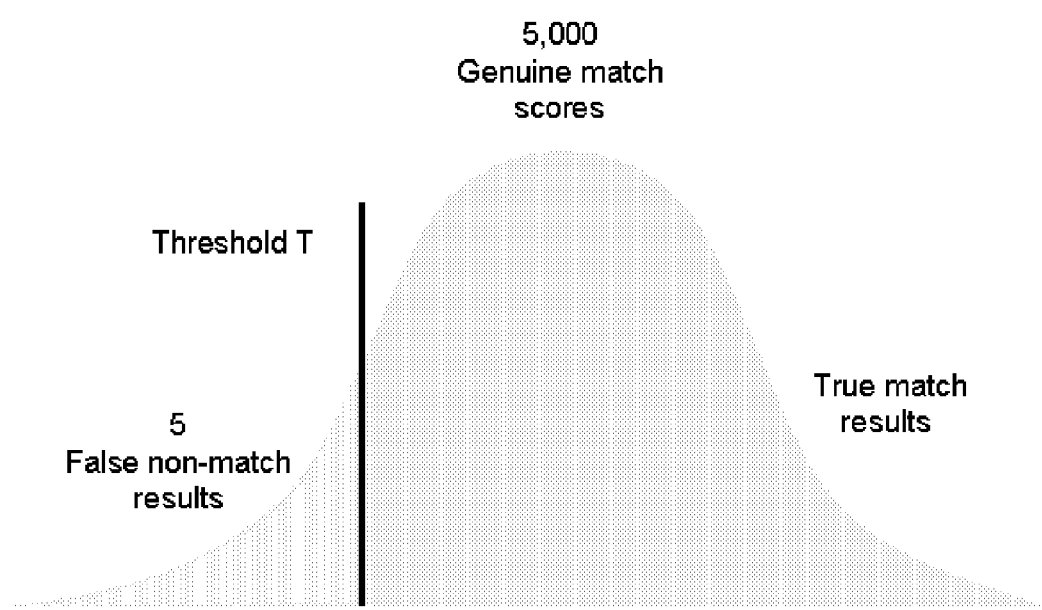
FIG. 8 illustrates an exemplary determination of a false match rate for the biometric identification system according to this invention.

As illustrated in FIG. 6, there are 49,995,000 match scores between imposter samples. With a threshold being defined as "T", 5,000 match scores are above that threshold. In FIG. 8, an illustration of the determination of false non-match rate is shown, with five false non-match results, 5,000 genuine match scores and again, a threshold of "T."

In accordance with a third exemplary embodiment, imposter match behavior of gallery samples is used to add a false match probability score to a match score in order to make better match/no match decisions. More particularly, this exemplary embodiment is based upon the premise that the "matchability" of both probe and gallery samples is useful in achieving higher confidence in higher match score results from a pair of samples. For example, some samples may illustrate a higher tendency to match than others. Some may have such a high tendency to match that they increase the false match rate of the biometric system. For example, consider the theoretical circumstance of a biometric sample in a gallery that exhibits the highest match score to every submitted probe sample. This would yield a false match rate of 100%. By assessing the matchability of gallery samples, which will be identified as a false match probability score, this data can be incorporated into the match results and thereby reduces the occurrence of false matches and false non-matches.

This false match probability score can be generated in cooperation with the confidence level module 140, in cooperation with one or more of I/O controller 150, processor 160, memory 170 and the various databases and galleries disclosed herein. For example, consider the scenario of a one-to-many search where a single probe sample P1 is compared against a gallery G1 of 10,000 samples G(x). The matching algorithm indicates, when compared to probe sample P1, that three gallery samples G(a), G(b) and G(c) yield match scores equal to or greater than the operating match threshold of T=85. It may be useful to know what the probability is that a match score result is actually an imposter match, i.e., a false match result.

The probability of a high-scoring match being false is assessed by: The frequency module 190, for each of the three probe/gallery sample pairs P1:G(a), P1:G(b), and P1:G(c), counting the following:

(a) FMO(P1:G(x))—within the corpus of false match score data yielded from the comparison between the probe sample P1 and all gallery G(x) samples, the observed number of occurrences of the false match score being greater than the match score result between the probe P1 and gallery samples G(a), G(b), and G(c).

(b) FMO(G(x):G1)—within the corpus of false match score data yielded from the comparison between gallery samples G(a), G(b), and G(c) and the rest of the gallery G1, the observed number of occurrences of false match scores above the match score result of the pair (c) FMP(P1:G(x))—probability of false match resulting from either P1 or G(x)

Note that regarding probability and determination of FMP:

$P(A \text{ and } B) = n(A \text{ and } B)/n(S)$ where $n(S)$ is the total number of possible outcomes $P(A \text{ or } B) = P(A) + P(B) - P(A \text{ and } B)$

TABLE 1

| results of 1: many match of a single probe sample | | | | |
|---|---|---|---|---|
| | | G(a) | G(b) | G(c) |
| Match score M(P1:G(x)) | algorithm result | 95 | 90 | 85 |
| FMO(P1:G(x)) count | False match occurrences count | 0 | 1 | 2 |
| FMO(P1:G(x)) percentage | False match occurrences percentage | 0.00% | 0.01% | 0.02% |
| FMO(G(x):G1) count | False match occurrences count | 12 | 2 | 3 |
| FMO(G(x):G1) percentage | False match occurrences percentage | 0.12% | 0.02% | 0.03% |
| FMP(P1:G(x)) | False match probability | 0.1200% | 0.0300% | 0.0500% |

From this result, it is evident that G(b) could be a more reliable match to P1 than G(a), even though its match score is lower, because the probability of a false match is less.

These techniques can also be applied to a multi-sample environment. For example, this technique can be used in order to apply appropriate weighting to a multi-sample probe.

For example, with a gallery G1 of 10,000 pairs of samples G(x) and a probe P1 each including 2 samples from the same source, such as left and right fingerprint samples:

A, B, C, D, and E represent the genuine match candidates in gallery G1 with the five highest comparison score results between probe sample pairs and gallery sample pairs as generated for each pair by the algorithm.

M(P1l:G(X)l) and M(P1r:G(X)r) represent each match score between respective left and right samples from probe set P1 and samples G(X).

FMO(P1l:G(X)l) represents the occurrences of false match scores above the given match score of the pair between each probe sample set and the entire gallery.

FMO(G(X)l:G1l) represents the occurrences of false match scores above the given match score of the pair between each gallery sample set and the entire gallery.

FMO(P1l:G1l) and FMO(P1r:G1r) represents the sum of these false match occurrences observed with the probe sample set and gallery sample set for left and right samples respectively.

FMP(P1:G1) represents the probability of a false match result of the given probe/gallery set.

Note that regarding probability and calculation of FMP:

$P(A \text{ and } B) = n(A \text{ and } B)/n(S)$ where $n(S)$ is the total number of possible outcomes $P(A \text{ or } B) = P(A) + P(B) - P(A \text{ and } B)$

TABLE 2 results of 1: many match of a two-sample probe and gallery of 10,000 sample sets

| | | sample | G(A) | G(B) | G(C) | G(D) | G(E) |
|---|---|---|---|---|---|---|---|
| M(P1l: G(X)l) | match score | left | 95 | 90 | 85 | 80 | 75 |
| M(P1r: G(X)r) | match score | right | 90 | 99 | 92 | 80 | 94 |
| FMO(P1l: G(X)l) | false match occurrences | left | 0 | 1 | 2 | 3 | 5 |
| FMO(P1r: G(X)r) | false match occurrences | right | 4 | 0 | 3 | 6 | 1 |
| FMO(G(X)l: G1l) | false match occurrences | left | 8 | 4 | 16 | 31 | 25 |
| FMO(G(X)r: G1r) | false match occurrences | right | 36 | 8 | 14 | 27 | 19 |
| FMO(P1l: G1r)l | false match occurrences sum | left | 8 | 5 | 18 | 34 | 30 |
| FMO(P1r: G1r) | false match occurrences sum | right | 40 | 8 | 17 | 33 | 20 |
| FMP(P1: G1) | False match probability | | 0.4797% | 0.1300% | 0.3497% | 0.6689% | 0.4994% |

One problem with the match score is illustrated in the above results. The match scores for the probe samples are tightly grouped and do not agree. While the left sample in gallery pair A generates the highest match score, gallery sample B yields the highest match score for the right sample. Therefore, it may be useful to perform additional analysis to ascertain which set is more likely the genuine match. The analysis below illustrates the gallery sample set candidate B exhibits the lowest likelihood of a false match, several times smaller than that of the other candidates and could be more confidently selected as the correct match.

For example, this exemplary analysis technique utilizes the biometric identification and verification system 100 in a multi-sample environment. Specifically, the match score module 110 determines a first match score between a first probe sample, e.g., a right sample, and a first gallery sample (right) in a gallery. The module then determines a plurality of gallery match scores between the first gallery sample and the plurality of other samples in the gallery and determines the number of the plurality of gallery match scores that are greater than the determined first match score. A plurality of probe match scores are then determined between the first probe sample and the plurality of other samples in the gallery as well as the number of the plurality of probe match scores that are greater than the determined first match score.

The match score module 110 then determines a second match score of a second probe sample, e.g., a left sample, and a second gallery sample in a gallery. The plurality of gallery match scores between the second gallery sample and the plurality of other samples in the gallery is then determined as well as the number of the plurality of gallery match scores that are greater than the determined second match score. A plurality of probe match scores between the second probe sample and the plurality of other samples in the gallery is then determined as well as the number of the plurality of probe match scores that are greater than the determined second match score. The match score module 110, in cooperation with one or more of the I/O controller 150, processor 160, and memory 170 then combines the determined information from the first and second samples to determine a false match probability level in cooperation with the confidence level module 140.

For example, with a gallery of 10,000 fingerprint/face sample pairs and a probe each including a fingerprint sample and face sample, A, B, C, D, and E represent the genuine candidates with the five highest match score results between probe sample pairs and gallery sample pairs.

In this example, there are 10,000 sample pairs in the gallery. M(P1f:G(X)f) and M(P1v:G(X)v) represent each match score between respective fingerprint and face samples. FMO(P1f:G(X)f) and FMO(P1v:G(X)v) represent the occurrences of false match scores above the given match score of the pair between each probe sample and the entire gallery for fingerprint and face samples, respectively. FMO(G(X)f:G1f) and FMO(G(X)v:G1y) represent the occurrences of false match scores above the given match score of the pair between each gallery sample and the entire gallery for fingerprint and face samples, respectively. FMO(P1f:G1f) and FMO(P1y:G1y) represent the sum of these false match occurrences observed with the probe sample and gallery sample. FMP(P1:G1) represents the probability of a false match result of the given probe/gallery set.

Note that regarding probability and calculation of FMP:

$$P(A \text{ and } B) = n(A \text{ and } B)/n(S) \text{ where } n(S) \text{ is the total number of possible outcomes}$$

$$P(A \text{ or } B) = P(A) + P(B) - P(A \text{ and } B)$$

TABLE 3 results of 1: many match of a two-sample multimodal probe and gallery of 10,000 sample sets

| | | | G(A) | G(B) | G(C) | G(D) | G(E) |
|---|---|---|---|---|---|---|---|
| M(f) | match score | fingerprint | 95 | 90 | 85 | 80 | 75 |
| M(v) | match score | face | 90 | 99 | 92 | 80 | 94 |
| FMO(P1f) | false match occurrences | fingerprint | 0 | 1 | 2 | 3 | 5 |
| FMO(P1v) | false match occurrences | face | 4 | 0 | 3 | 6 | 1 |

TABLE 3-continued results of 1: many match of a two-sample multimodal probe and gallery of 10,000 sample sets

|  |  |  | G(A) | G(B) | G(C) | G(D) | G(E) |
|---|---|---|---|---|---|---|---|
| FMO(Gxf) | false match occurrences | fingerprint | 8 | 4 | 16 | 31 | 25 |
| FMO(Gxv) | false match occurrences | face | 36 | 8 | 14 | 27 | 19 |
| FMP(f) | false match occurrences sum | fingerprint | 0.08% | 0.05% | 0.18% | 0.34% | 0.30% |
| FMP(v) | false match occurrences sum | face | 0.40% | 0.08% | 0.17% | 0.33% | 0.20% |
| FMP | False match probability |  | 0.4797% | 0.1300% | 0.3497% | 0.6689% | 0.4994% |

The problem with match score is illustrated in the results above; the match scores for the probe samples are tightly grouped and do not agree. While the fingerprint sample in gallery pair A generates the highest match score, gallery sample B yields the highest match score for the face sample. Therefore, it is useful to perform additional analysis to ascertain which set is most likely the genuine match.

The analysis illustrates that gallery sample set candidate B exhibit the lowest likelihood of a false match, several times smaller than that of the other candidates and can be more confidently selected as the correct match.

This exemplary embodiment applied to a multimodal environment includes a similar series of steps. More specifically, the match score module 110 determines a first match score of a first probe sample corresponding to a mode, e.g., a fingerprint, and a first gallery sample in a gallery. The module then determines a plurality of gallery match scores between the first gallery sample and the plurality of other samples in the gallery and determines the number of the plurality of gallery match scores that are greater than the determined first match score.

The match score module 110 then determines a plurality of probe match scores between the first probe sample and the plurality of other samples in the gallery and determines the number of the plurality of probe match scores that are greater than the determined first match score. A second match score of a second probe sample is corresponding to a mode (e.g., a face and a second gallery sample in the gallery is then determined). The plurality of gallery match scores between the second gallery sample and the plurality of other samples in the gallery is then determined as well as the number of the plurality of gallery match scores that are greater than the determined second match score. A plurality of probe match scores between the second probe sample and the plurality of other samples in the gallery is then determined as well as the number of the plurality of probe match scores that are greater than the determined second match score. The confidence level module then combines the determined information from the first and second sample to determine a false match probability level.

Biometric Verification

There is also problem in biometric systems where matching performance is not optimized because the same matching threshold is applied to all match pairs regardless of their observed behavior and performance.

Consider the scenario of biometric access control system, where employees use biometrics to gain entrance into a facility. A typical biometric system works by storing a single biometric sample of each employee in a biometric database. Each time the employee attempts to access the facility, a live biometric sample is generated and then compared to the sample from that employee that is stored in the database. A biometric matcher is used to measure the similarity between the two samples, and if the similarity score is above a preset match threshold, then the samples are determined to be derived from the same source, and the individual is granted access to the facility. If the samples are compared and the similarity score is below the threshold, the individual is determined not to match and thus denied access to the facility.

But consider the individual whose biometric samples generate comparatively low match scores to both genuine and impostor samples. This individual, while less likely to cause a false match with an impostor, will experience a higher rate of false non-match incidents. The biometric system would achieve higher overall performance if a lower match threshold derived specifically for this individual was applied upon their access attempts.

Also consider the individual whose biometric samples generate comparatively high match scores to both genuine and impostor samples. This individual will experience a lower rate of false non-match incidents, but is more likely to cause a false match with an impostor. The biometric system would achieve higher overall performance if a higher match threshold derived specifically for this individual was applied upon their access attempts.

In accordance with an exemplary embodiment, the biometric identification and verification system uses previous genuine and impostor match score data to automate derivation of an individualized verification match threshold score.

More specifically, the following exemplary procedure describes how this problem can be addressed using impostor and genuine match score data.

For each individual enrolled in a biometric system, the match score module 110 creates a database of match scores observed between all genuine and all impostor samples and stores it in a gallery, such as gallery 194. That is, a unique sample pair for all possible combinations of genuine sample and impostor sample match scores is created.

Next, the histogram module 120 creates a cumulative histogram data table recording the number of these impostor match scores that are greater than that score divided by the total number of samples. This value is the "false match rate" associated with each possible threshold used in the system.

For each individual enrolled in a biometric system, the match score module 110 generates a database of match scores observed between all genuine samples. That is, a unique sample pair for all possible combinations of genuine samples is created.

Then, the histogram module 120 creates a cumulative histogram data table recording for each possible match score less than that score divided by the total number of samples. This value is the "false non-match rate" associated with each possible threshold used in the system.

The threshold module 130 manually or automatically utilizes the match threshold that results in FMR and FNMR matching performance within a targeted range.

EXAMPLE

A company maintains a biometric system used for restricting access to a facility. There are 100 employees who have each used the system for 1000 days. A single biometric sample is collected from each employee once per day. Therefore, each employee has 1000 genuine samples in the database, and there are a total of 100,000 samples in the database.

For each employee, a "FMR" database is made up of all match scores generated from all unique genuine-impostor pairs. It follows that this FMR database for each employee contains 1,000*99,000=99,000,000 match scores.

An FMR histogram is generated for each employee, which is used to generate a table that relates the associated false match rate to each match score threshold.

Also, for each employee, an "FNMR" database is made up of match scores generated from all unique genuine-genuine pairs. It follows that the FNMR database for each employee contains n(n−1)/2 or 1000*(999)/2=499,500 match scores.

An FNMR histogram is generated for each employee, which is used to generate a table that relates the associated false non-match rate to each match score threshold.

For each employee, these tables are combined to exhibit both the probability of a false match and probability of a false non-match for each threshold value. With this data, a user, with the cooperation of the input device 240, can either manually or automatically select a match threshold that satisfactorily achieves the FMR and FNMR targets of the biometric system.

Figure 16:
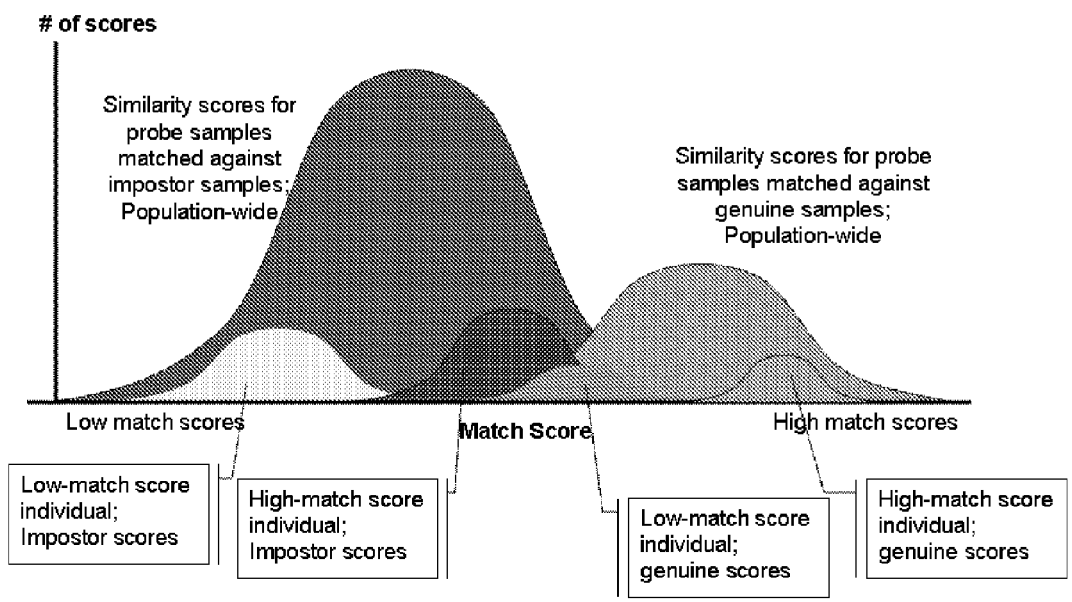
FIG. 16 illustrates a comparison of a number of scores to match scores according to this invention.

FIG. 16 illustrates an example of a comparison of the number of scores to match scores. More specifically, highlighted are the low-match score individual; imposter scores, the high-match score individual; imposter scores, the low-match score individual; genuine scores, and the high-match score individual; genuine scores.

Figure 17:
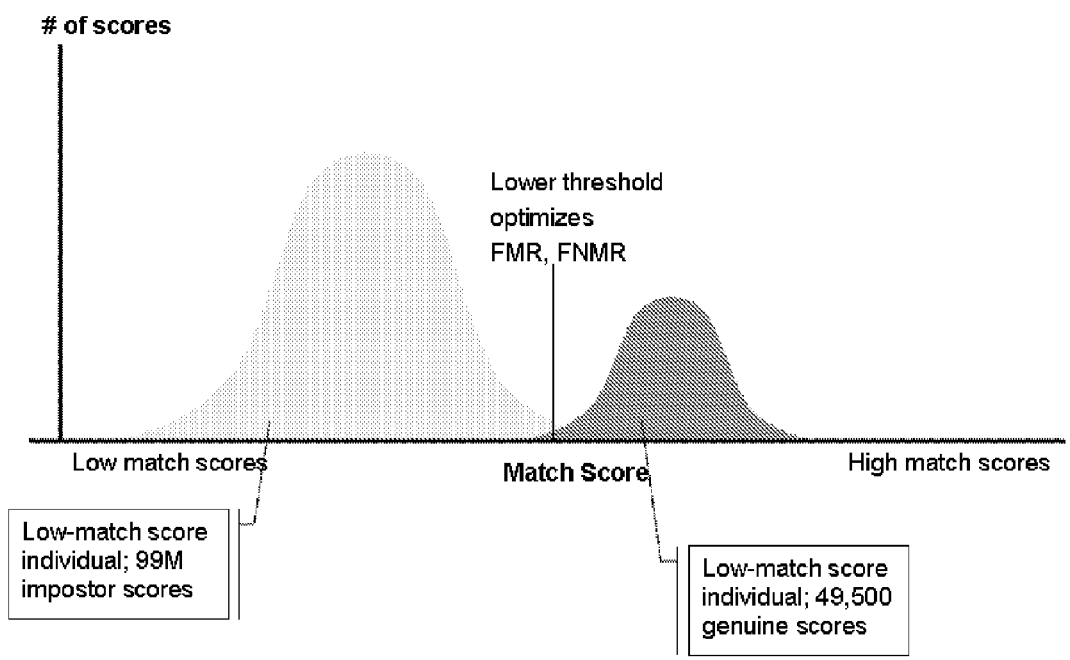
FIG. 17 illustrates the effects of lowering the threshold according to this invention.
Figure 18:
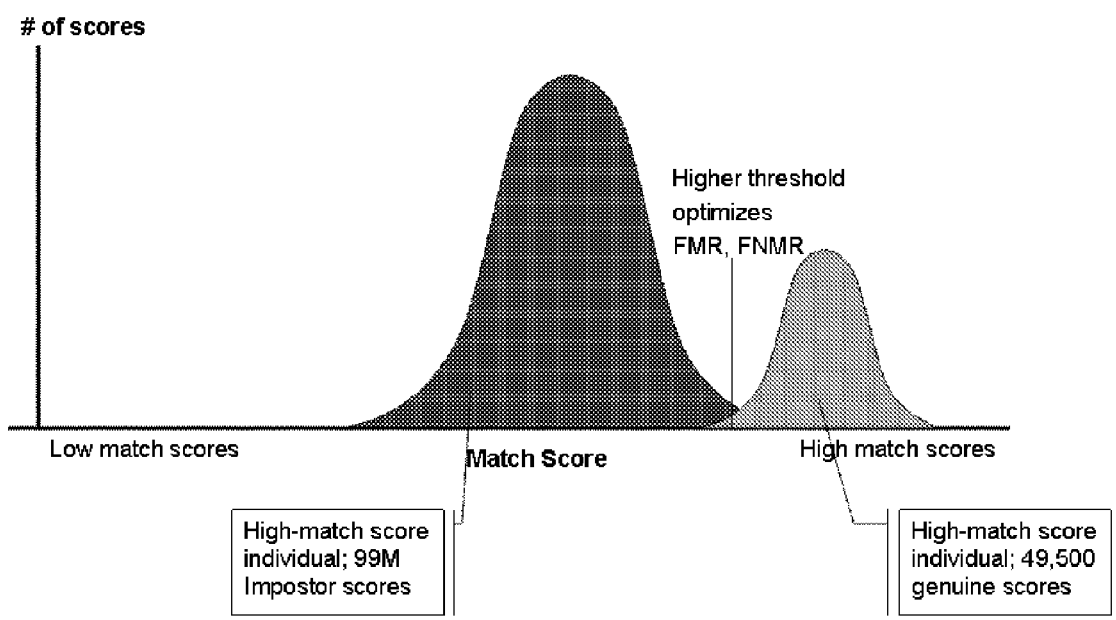
FIG. 18 illustrates the effects of setting a higher threshold according to this invention.

In FIG. 17, an example is given that illustrates that a lower threshold optimizes the FMR and FNMR. Another example is given in FIG. 18, where it can be seen that a higher threshold optimizes the FMR and FNMR.

Figure 5:
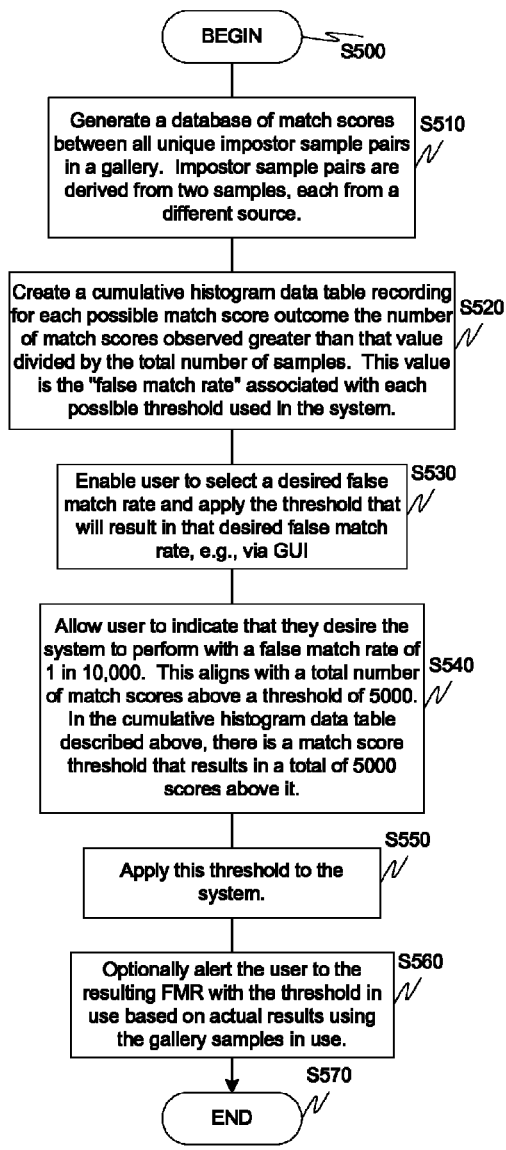
FIG. 5 illustrates an exemplary method for using imposter match score data to automate derivation of a match threshold score that results in the desired biometric identification system false match rate and false non-match rate according to this invention.

FIG. 5 illustrates an exemplary method of using imposter match score data to automate derivation of a match threshold score for biometric identification that results in the desired system false match rate and false non-match rate. In particular, control begins in step S500 and continues to step S510. In step S510, a database of match scores between all unique imposter sample pairs in a gallery is generated. Imposter sample pairs are derived from two samples, each from a different source. Next, in step S520, a cumulative histogram data table recording for each possible match score outcome the number of match scores observed greater than that valued by the total number of samples is created. This value is the false match rate associated with each possible threshold used in the system. Then, in step S530, a user selects a desired false match rate and applies the threshold that will result in that desired false match rate. Control then continues to step S540.

In step S540, a user specifies a desired false match rate. This threshold is then applied to the system in step S550 with an optional alert being sent in step S560 to alert the user to the resulting FMR with the threshold in use based on actual results using the gallery samples in use. Control then continues to step S570 where the control sequence ends.

Figure 7:
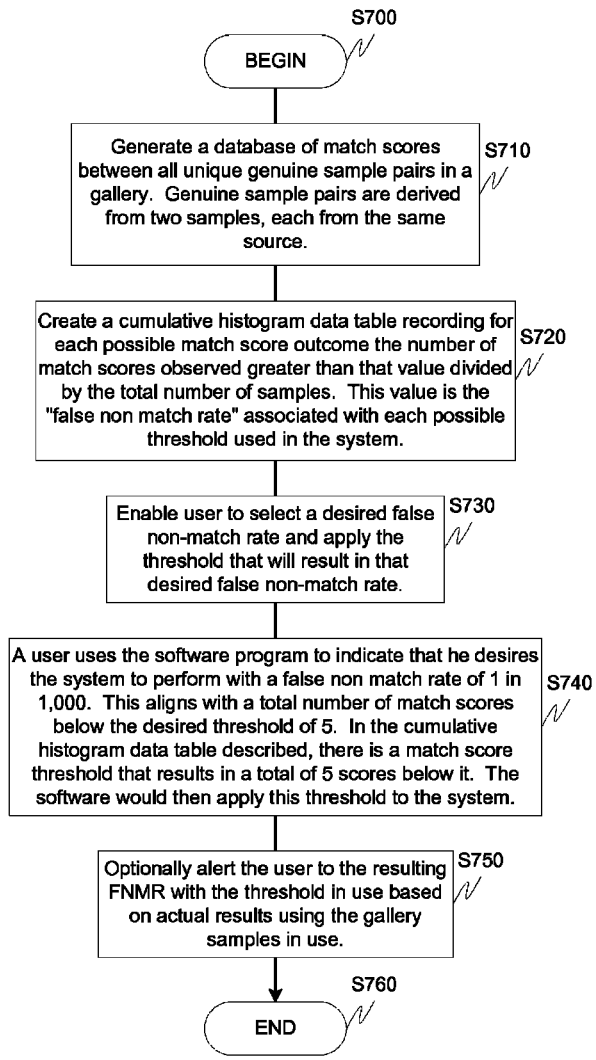
FIG. 7 illustrates an exemplary method for using genuine match score data to automate derivation of a match threshold score that results in the desired biometric identification system false match rate and false non-match rate according to this invention.

FIG. 7 illustrates an exemplary method for using genuine match score data to automate derivation of a match threshold score that results in the desired system false match rate and false non-match rate for biometric identification. In particular, control begins in step S700 and continues to step S710. In step S710, a database of match scores between all unique genuine sample pairs in a gallery is generated. The genuine sample pairs are derived from two samples, each from the same source. Next, in step S720, a cumulative histogram data table recording for each possible match score outcome and number of match scores observed greater than that value divided by the total number of samples is created. This value is the false non-match rate associated with each possible threshold used in the system. Then, in step S730, a user can select a desired false non-match rate and apply the threshold that will result in the desired false non-match rate. Control then continues to step S740.

In step S740, a user can then specify how they would like the system to perform with a false non-match rate of, for example, 1 in 1,000. As with the previous example, in step S750 the user can optionally be alerted with control continuing to step S760 where the control sequence ends.

Figure 9:
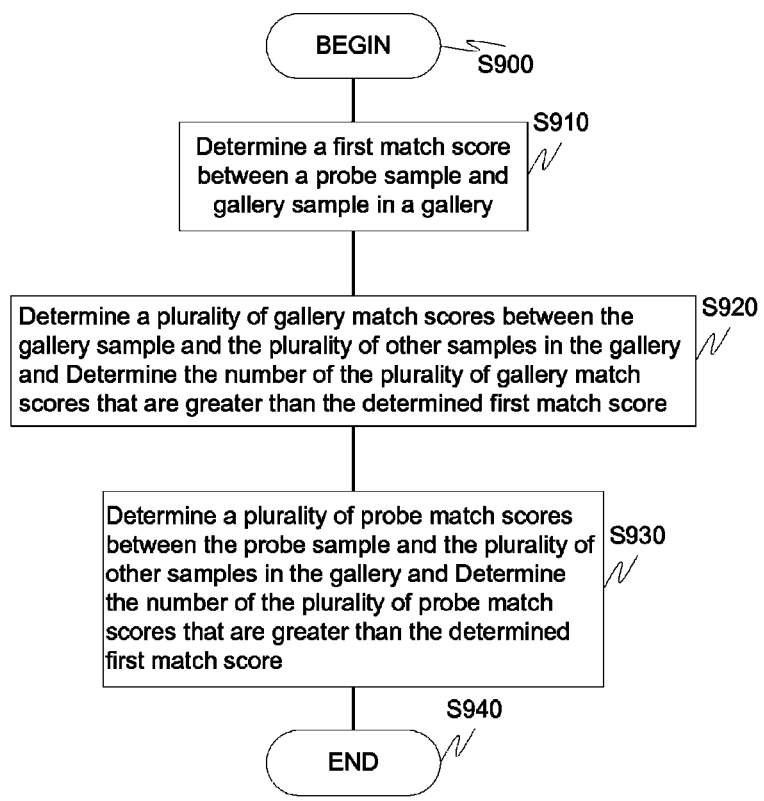
FIG. 9 illustrates exemplary false match confidence score determination according to this invention.

FIG. 9 illustrates an exemplary method of determining a false match confidence score according to this invention. In particular, control begins in step S900 and continues to step S910. In step S910, a first match score between a probe sample and a gallery sample in a gallery is determined. Next, in step S920, a plurality of gallery match scores between the gallery sample and the plurality of other samples in the gallery are determined as well as the number of the plurality of gallery match scores that are greater than the determined first match score. Then, in step S930, a plurality of probe match scores between the probe sample and the plurality of other samples in the gallery is determined as well as the number of the plurality of probe match scores that are greater than the determined first match score. Control then continues to step S940 where the control sequence ends.

Figure 10:
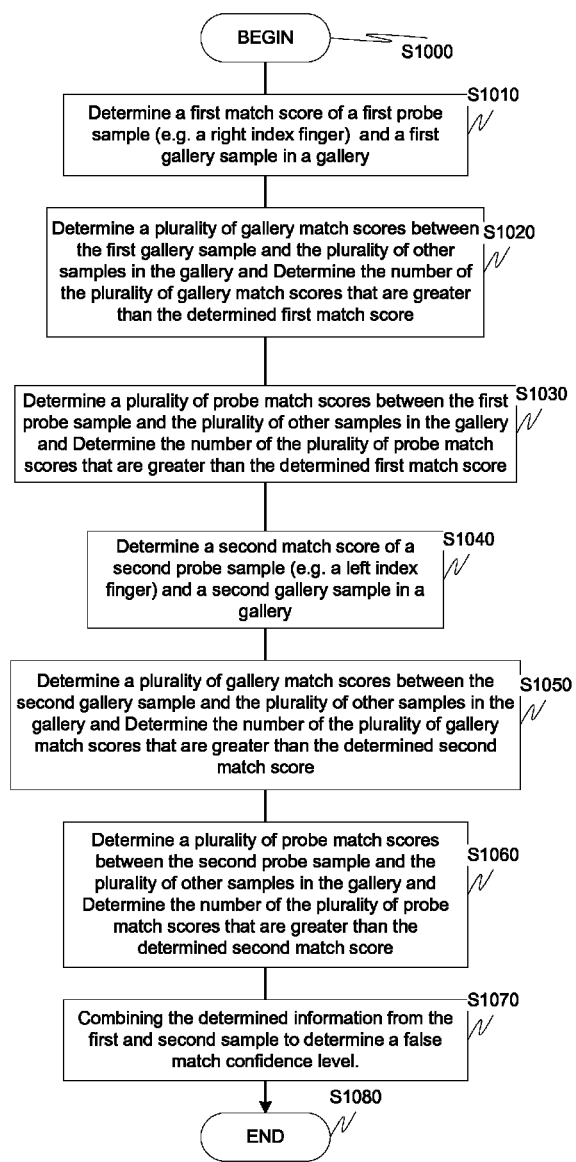
FIG. 10 illustrates an exemplary method for applying the techniques disclosed herein to a multi-sample environment according to this invention.

FIG. 10 illustrates an exemplary method of applying the technique disclosed herein to a multi-sample environment. In particular, control begins in step S1000 and continues to step S1010. In step S1010, a first match score of a first probe sample and a first gallery sample in a gallery are determined. Next, in step S1020, a plurality of gallery match scores between the first gallery sample and the plurality of other samples in the gallery are determined as well as the number of the plurality of gallery match scores that are greater than the determined first match score. Then, in step S1030, a plurality of probe match scores between the first probe sample and the plurality of other samples in the gallery is determined as well as the number of the plurality of probe match scores that are greater than the determined first match score. Control then continues to step S1040.

In step S1040, a second match score of a second probe sample and a second gallery sample in a gallery are determined. Next, in step S1050, a plurality of gallery match scores between the second gallery sample and the plurality of other samples in the gallery are determined as well as the number of the plurality of gallery match scores that are greater than the determined second match score. Next, in step S1060, a plurality of probe match scores between the second probe sample and the plurality of other samples in the gallery is determined as well as the number of the plurality of probe match scores that are greater than the determined second match score. In step S1070, the determined information from the first and second sample is combined to determine a false match confidence level with control continuing to step S1080 where the control sequence ends.

Figure 11:
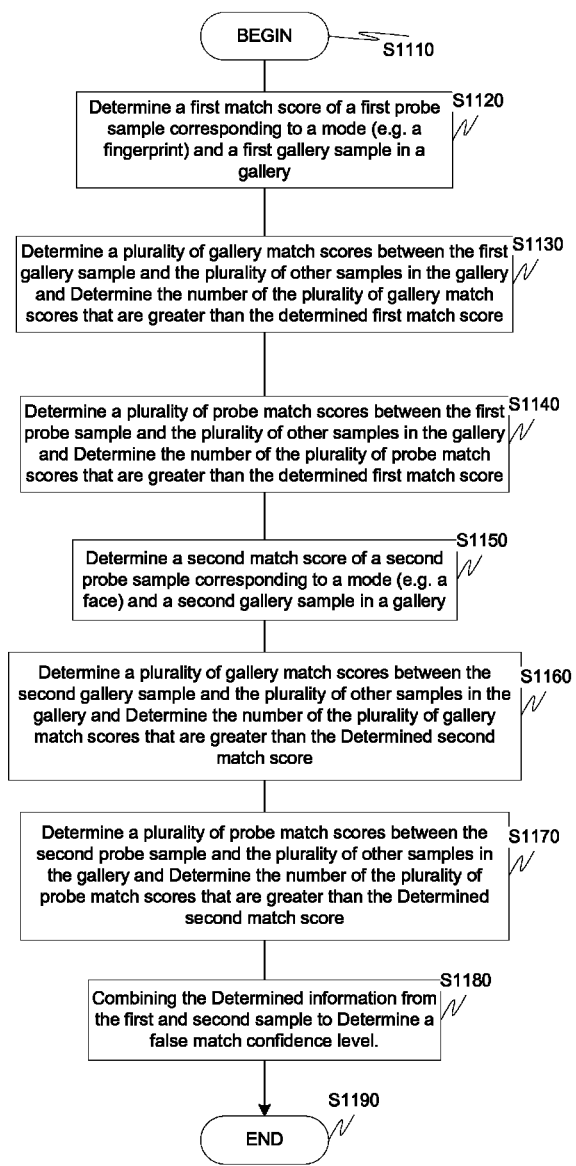
FIG. 11 illustrates an exemplary method for applying the techniques disclosed herein to a multi-modal environment according to this invention.
Figure 12:
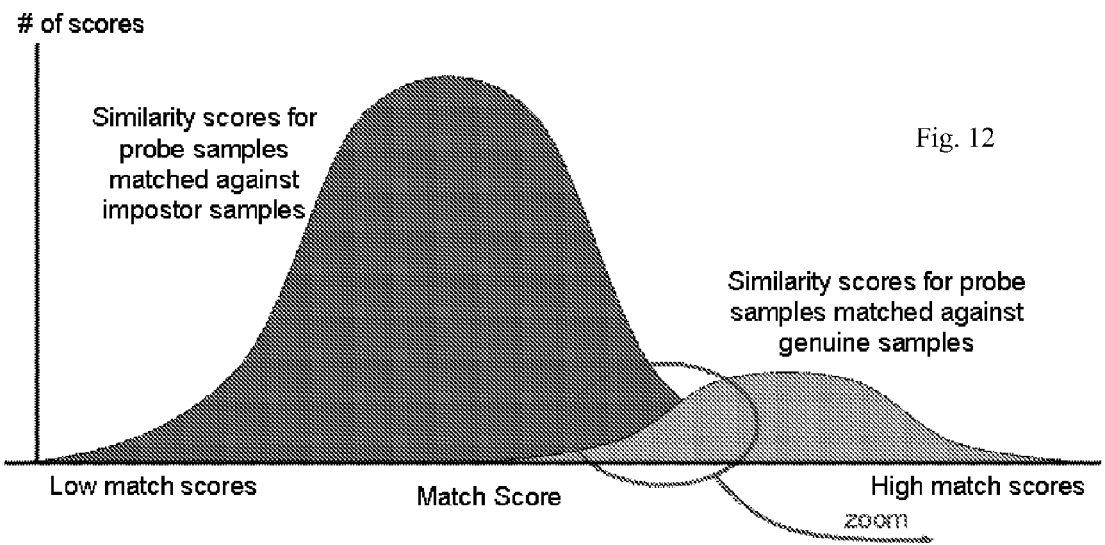
FIG. 12 illustrates an example of match results exhibited by a true biometric verification system according to this invention.
Figure 13:
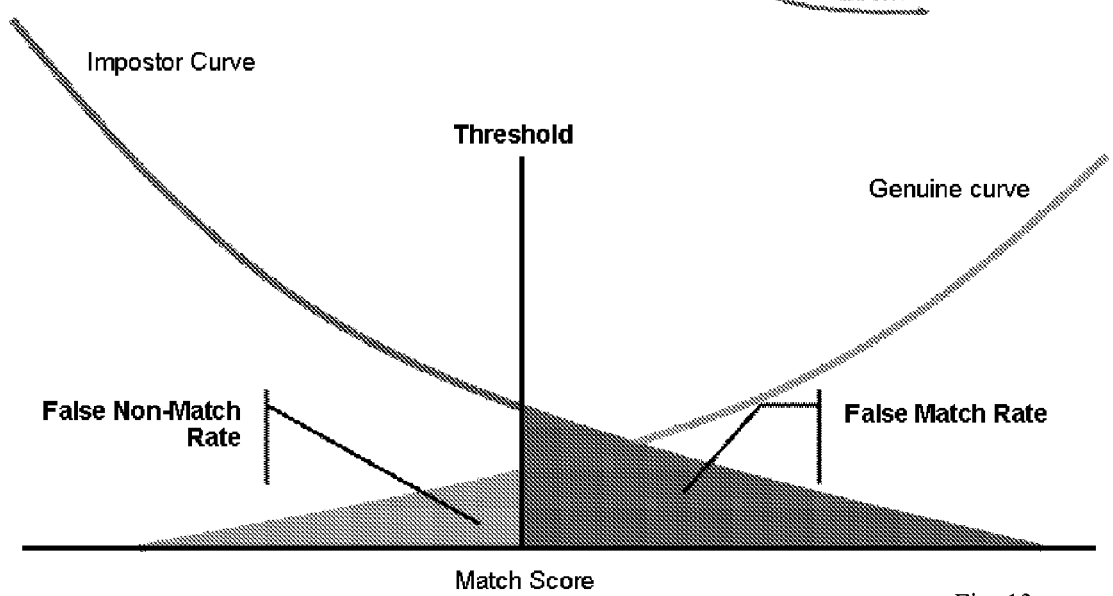
FIG. 13 illustrates the setting of a biometric verification system threshold according to this invention.
Figure 14:
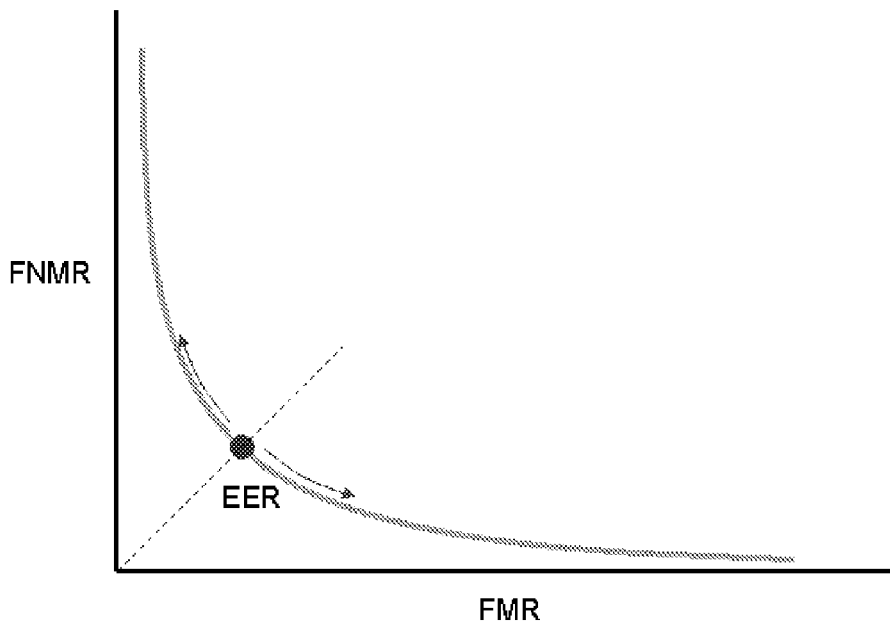
FIG. 14 illustrates the equal error rate according for the biometric verification system according to this invention.

FIG. 11 illustrates an exemplary embodiment of the extension of the technique to a multi-modal environment. In particular, control begins in step S1110 and continues to step S1120. In step S1120, a first match score of a first probe sample corresponding to a mode and a first gallery sample in a gallery are determined. Next, in step S1130, a plurality of gallery match scores between the first gallery sample and the plurality of other samples in the gallery are determined as well as the number of plurality of gallery match scores that are greater than the determined first match score. Then, in step S1140, a plurality of probe match scores between the first probed sample and the plurality of other samples in the gallery are determined as well as the number of the plurality of probe match scores that are greater than the determined first match score. Control then continues to step S1150.

In step S1150, a second match score of a second probe sample corresponding to a mode and a second gallery sample in a gallery are determined. Next, in step S1160, a plurality of gallery match scores between the second gallery sample and the plurality of other samples in the gallery are determined as well as the number of plurality of gallery match scores that are greater than the determined second match score. Next, in step S1170, a plurality of probe match scores between the second probe sample and the plurality of other samples in the gallery are determined as well as the number of the plurality of probe match scores that are greater than the determined second match score. The determined information from the first and second sample is then combined to determine a false match confidence level in step S1180 with control continuing to step S1190 where the control sequence ends.

Figure 15:
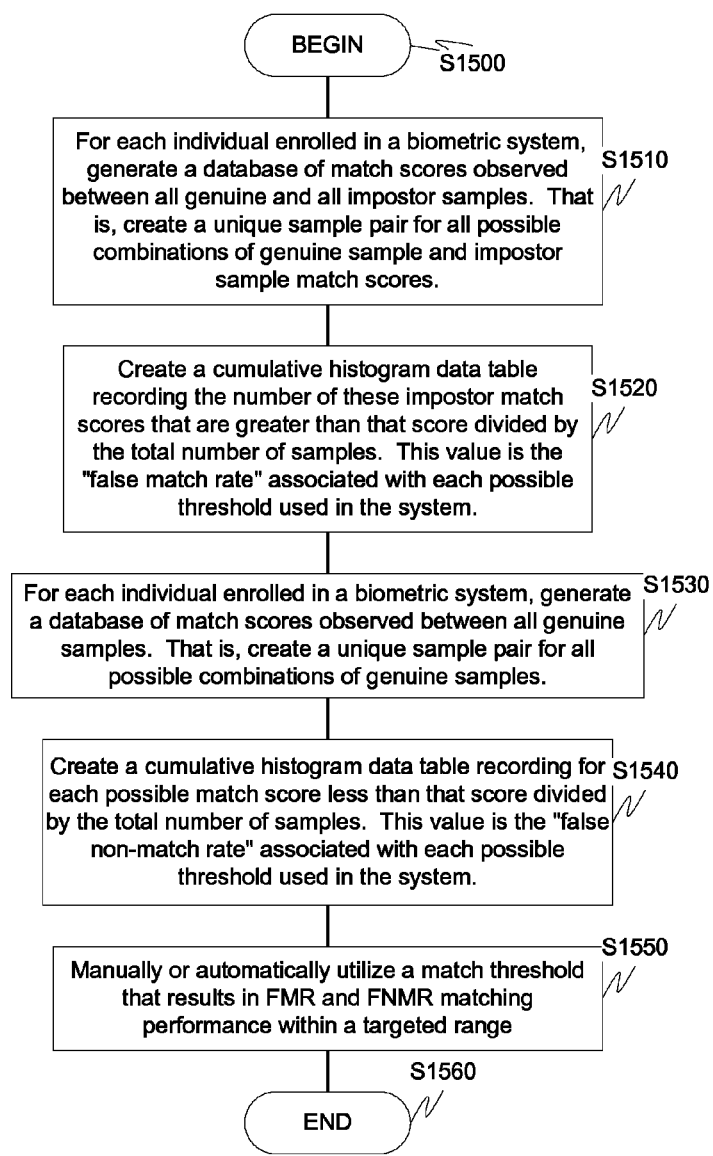
FIG. 15 illustrates an exemplary method for using previous genuine and imposter match score data to automate derivation of an individual verification match threshold score according to this invention.

FIG. 15 illustrates an exemplary embodiment for using previous genuine imposter match score data to automate derivation of an individualized verification match threshold score. In particular, control begins in step S1500 and continues to step S1510. In step S1510, for each individual enrolled in a biometric system, a database of match scores observed between all genuine and all imposter samples is generated. Next, in step S1520, a cumulative histogram data table recording the number of these imposter match scores that are greater than that score divided by the total number of samples is created. This value is the false match rate associated with each possible threshold used in the system. Then, in step S1530, for each individual enrolled in the biometric system, a database and match score is observed between all genuine samples as generated. That is, a unique sample pair for all possible combinations of genuine samples is created. Control then continues to step S1540.

In step S1540, a cumulative histogram data table recording for each possible match score less than that score divided by the total number of samples is created. This value is the false non-match rate associated with each possible threshold used in the system. Next, in step S1550, this match threshold that results in FMR and FNMR matching performance within a targeted range is one or more of manually and/or automatically utilized. Control then continues to step S1560 where the control sequence ends.

The described systems and methods can be implemented on an image processing device, biometric processing device, fingerprint processing device, or the like, or on a separate programmed general purpose computer having image processing capabilities. Additionally, the systems and methods of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, or the like. In general, any device capable of implementing a state machine that is in turn capable of implementing the flowcharts illustrated herein can be used to implement the image processing system according to this invention.

Furthermore, the disclosed methods may be readily implemented in software stored on a computer-readable media using object or object-oriented software development environments that provide portable source code that can be used on a variety of computer or workstation platforms. Alternatively, the disclosed system may be implemented partially or fully in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The systems and methods illustrated herein however can be readily implemented in hardware and/or software using any known or later developed systems or structures, devices and/or software by those of ordinary skill in the applicable art from the functional description provided herein and with a general basic knowledge of the computer and image processing arts.

Moreover, the disclosed methods may be readily implemented in software executed on programmed general purpose computer, a special purpose computer, a microprocessor, or the like. In these instances, the systems and methods of this invention can be implemented as program embedded on personal computer such as JAVA® or CGI script, as a resource residing on a server or graphics workstation, as a routine embedded in a dedicated fingerprint processing system, as a plug-in, or the like. The system can also be implemented by physically incorporating the system and method into a software and/or hardware system, such as the hardware and software systems of an image processor.

It is, therefore, apparent that there has been provided, in accordance with the present invention, systems and methods for biometric identification and verification which may be particularly useful when used with fingerprints. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

The invention claimed is:

1. A method of using impostor match behavior of biometric gallery samples to add a false match probability score to a match score to assist with match/no match decisions comprising:

determining a first match score between a biometric probe sample and a gallery sample;

determining, as the false match probability score, a plurality of gallery match scores between the gallery sample and a plurality of other samples;

determining a number of the plurality of gallery match scores that are greater than the determined first match score;

determining a plurality of probe match scores between the probe sample and the plurality of other samples;

determining a number of the plurality of probe match scores that are greater than the determined first match score; and using information from the above determining steps to assist with match/no match decisions.

2. A method of using impostor match behavior of biometric gallery samples to add a false match probability score to a match score to assist with match/no match decisions when there is a multi-sample probe comprising:
determining a first match score between a first probe sample and a first gallery sample;
determining, as the false match probability score, a plurality of gallery match scores between the first gallery sample and a plurality of other samples;
determining a number of the plurality of gallery match scores that are greater than the determined first match score;
determining a plurality of probe match scores between the first probe sample and the plurality of other samples;
determining a number of the plurality of probe match scores that are greater than the determined first match score;
determining a second match score of a second probe sample and a second gallery sample;
determining a plurality of gallery match scores between the second gallery sample and the plurality of other samples;
determining a number of the plurality of gallery match scores that are greater than the determined second match score;
determining a plurality of probe match scores between the second probe sample and the plurality of other samples;
determining a number of the plurality of probe match scores that are greater than the determined second match score; and
combining information from the first probe sample and the second probe sample to determine a false match probability level.

3. A method of using impostor match behavior of biometric gallery samples to add a false match probability score to a match score to assist with match/no match decisions in a multi-modal environment comprising:
determining a first match score of a first probe sample corresponding to a mode and a first gallery sample;
determining, as the false match probability score, a plurality of gallery match scores between the first gallery sample and a plurality of other samples;
determining a number of the plurality of gallery match scores that are greater than the determined first match score;
determining a plurality of probe match scores between the first probe sample and a plurality of other samples;
determining a number of the plurality of probe match scores that are greater than the determined first match score;
determining a second match score of a second probe sample corresponding to a second mode and a second gallery sample;
determining a plurality of gallery match scores between the second gallery sample and a plurality of other samples;
determining a number of the plurality of gallery match scores that are greater than the determined second match score;
determining a plurality of probe match scores between the second probe sample and a plurality of other samples;
determining a number of the plurality of probe match scores that are greater than the determined second match score; and
combining information from the first probe sample and the second probe sample to determine a false match probability level.

4. A system that uses impostor match behavior of biometric gallery samples to add a false match probability score to a match score to assist with match/no match decisions comprising:
a match score module and a processor configured to:
determine a first match score between a biometric probe sample and a gallery sample;
determine, as the false match probability score, a plurality of gallery match scores between the gallery sample and a plurality of other samples;
determine a number of the plurality of gallery match scores that are greater than the determined first match score;
determine a plurality of probe match scores between the probe sample and the plurality of other samples;
determine a number of the plurality of probe match scores that are greater than the determined first match score; and
using information from the above determining steps to assist with match/no match decisions.

5. A system that uses impostor match behavior of biometric gallery samples to add a false match probability score to a match score to assist with match/no match decisions when there is a multi-sample probe comprising:
a match score module and a processor configured to:
determine a first match score between a first probe sample and a first gallery sample;
determine, as the false match probability score, a plurality of gallery match scores between the first gallery sample and a plurality of other samples;
determine a number of the plurality of gallery match scores that are greater than the determined first match score;
determine a plurality of probe match scores between the first probe sample and the plurality of other samples;
determine a number of the plurality of probe match scores that are greater than the determined first match score;
determine a second match score of a second probe sample and a second gallery sample;
determine a plurality of gallery match scores between the second gallery sample and the plurality of other samples;
determine a number of the plurality of gallery match scores that are greater than the determined second match score;
determine a plurality of probe match scores between the second probe sample and the plurality of other samples;
determine a number of the plurality of probe match scores that are greater than the determined second match score; and
combine information from the first probe sample and the second probe sample to determine a false match probability level.

6. A system that uses impostor match behavior of biometric gallery samples to add a false match probability score to a match score to assist with match/no match decisions in a multi-modal environment comprising:
a match score module and a processor configured to:
determine a first match score of a first probe sample corresponding to a mode and a first gallery sample;
determine, as the false match probability score, a plurality of gallery match scores between the first gallery sample and a plurality of other samples;
determine a number of the plurality of gallery match scores that are greater than the determined first match score;
determine a plurality of probe match scores between the first probe sample and a plurality of other samples;

determine a number of the plurality of probe match scores that are greater than the determined first match score;

determine a second match score of a second probe sample corresponding to a second mode and a second gallery sample;

determine a plurality of gallery match scores between the second gallery sample and a plurality of other samples;

determine a number of the plurality of gallery match scores that are greater than the determined second match score;

determine a plurality of probe match scores between the second probe sample and a plurality of other samples;

determine a number of the plurality of probe match scores that are greater than the determined second match score; and combine information from the first probe sample and the second probe sample to determine a false match probability level.

7. The method of claim 1, wherein the method is for a one-to-many search.

8. The method of claim 1, wherein a single probe sample P1 is compared against a gallery G1 of samples G(x).

9. The method of claim 1, further comprising indicating, when compared to probe sample P1, that three gallery samples G(a), G(b) and G(c) yield match scores equal to or greater than an operating match threshold.

10. The method of claim 9, wherein for each of three probe/gallery sample pairs P1:G(a), P1:G(b), and P1:G(c), the following is counted:
   a) within a corpus of false match score data yielded from the comparison between the probe sample P1 and all gallery G(x) samples, an observed number of occurrences of the false match score being greater than the match score result between the probe P1 and gallery samples G(a), G(b), and G(c);
   b) within a corpus of false match score data yielded from the comparison between gallery samples G(a), G(b), and G(c) and the rest of the gallery G1, an observed number of occurrences of false match scores above the match score result of the pair; and
   c) a probability of a false match resulting from either P1 or G(x).

11. The method of claim 2, wherein the first probe sample is a right sample.

12. The method of claim 2, wherein the second probe sample is a left sample.

13. The method of claim 3, wherein a first mode is a fingerprint.

14. The method of claim 3, wherein a second mode is a face.

15. The system of claim 4, wherein the system is for a one-to-many search.

16. The system of claim 4, wherein a single probe sample P1 is compared against a gallery G1 of samples G(x).

17. The system of claim 4, further comprising an alert module that indicates, when compared to probe sample P1, that three gallery samples G(a), G(b), and G(c) yield match scores equal to or greater than an operating match threshold.

18. The system of claim 17, wherein for each of three probe/gallery sample pairs P1:G(a), P1:G(b), and P1:G(c), the following is counted:
   a) within a corpus of false match score data yielded from the comparison between the probe sample P1 and all gallery G(x) samples, an observed number of occurrences of the false match score being greater than the match score result between the probe P1 and gallery samples G(a), G(b), and G(c);
   b) within a corpus of false match score data yielded from the comparison between gallery samples G(a), G(b), and G(c) and the rest of the gallery G1, an observed number of occurrences of false match scores above the match score result of the pair; and
   c) a probability of a false match resulting from either P1 or G(x).

19. The system of claim 5, wherein the first probe sample is a right sample.

20. The system of claim 5, wherein the second probe sample is a left sample.

21. The system of claim 6, wherein a first mode is a fingerprint.

22. The system of claim 6, wherein a second mode is a face.

* * * * *